(12) United States Patent
Zhang et al.

(10) Patent No.: US 11,544,531 B2
(45) Date of Patent: Jan. 3, 2023

(54) METHOD AND APPARATUS FOR GENERATING STORY FROM PLURALITY OF IMAGES BY USING DEEP LEARNING NETWORK

(71) Applicant: SEOUL NATIONAL UNIVERSITY R&DB FOUNDATION, Seoul (KR)

(72) Inventors: Byoung-Tak Zhang, Seoul (KR); Min-Oh Heo, Seoul (KR); Taehyeong Kim, Anyang-si (KR); Seon Il Son, Gimpo-si (KR); Kyung-Wha Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 545 days.

(21) Appl. No.: 16/696,088

(22) Filed: Nov. 26, 2019

(65) Prior Publication Data

US 2020/0184317 A1    Jun. 11, 2020

(30) Foreign Application Priority Data

Dec. 5, 2018  (KR) .................. 10-2018-0155438
Jun. 4, 2019  (KR) .................. 10-2019-0065955

(51) Int. Cl.
*G06K 9/62* (2022.01)
*G06N 3/04* (2006.01)
(Continued)

(52) U.S. Cl.
CPC ......... *G06N 3/0454* (2013.01); *G06K 9/6256* (2013.01); *G06N 3/08* (2013.01);
(Continued)

(58) Field of Classification Search
CPC ...... G06K 9/6256; G06N 3/0454; G06N 3/08; G06T 7/11; G06T 2207/20081; G06V 10/454; G06V 30/194
See application file for complete search history.

(56) References Cited

U.S. PATENT DOCUMENTS 10,198,761 B2 * 2/2019 Li .......................... G06Q 50/01
10,504,023 B1 * 12/2019 Bengio ................ G06N 3/0445
(Continued)

FOREIGN PATENT DOCUMENTS

CN        106650789 A  *  5/2017  ........... G06K 9/6256

OTHER PUBLICATIONS

Liu et al. ("Storytelling of Photo Stream with Bidirectional Multi-thread Recurrent Neural Network," arXiv:1606.00625v1; Jun. 2, 2016) (Year: 2016).*

(Continued)

*Primary Examiner* — Yubin Hung
(74) *Attorney, Agent, or Firm* — Sughrue Mion, PLLC (57) ABSTRACT

Disclosed herein are a visual story generation method and apparatus for generating a story from a plurality of images by using a deep learning network. The visual story generation method includes: extracting features from a plurality of respective images by using the first extraction unit of a deep learning network; generating the structure of a story based on the overall feature of the plurality of images by using the
(Continued)

second extraction unit of the deep learning network; and generating the story by using outputs of the first and second extraction units.

9 Claims, 7 Drawing Sheets

(51) Int. Cl.
 *G06N 3/08* (2006.01)
 *G06V 10/44* (2022.01)
 *G06T 7/11* (2017.01)
 *G06V 30/194* (2022.01)

(52) U.S. Cl.
 CPC .............. *G06T 7/11* (2017.01); *G06V 10/454* (2022.01); *G06V 30/194* (2022.01); *G06T 2207/20081* (2013.01)

(56) References Cited

U.S. PATENT DOCUMENTS

| | | | |
|---|---|---|---|
| 10,713,830 B1* | 7/2020 | Yang | G06V 10/82 |
| 10,726,306 B1* | 7/2020 | Yang | G06V 10/25 |
| 2010/0332958 A1* | 12/2010 | Weinberger | G06F 16/4387 715/201 |
| 2016/0140435 A1* | 5/2016 | Bengio | G06F 40/40 382/158 |
| 2017/0200065 A1* | 7/2017 | Wang | G06F 16/583 |
| 2018/0144248 A1* | 5/2018 | Lu | G06N 3/08 |
| 2019/0198157 A1* | 6/2019 | Beymer | G06V 20/49 |
| 2019/0286931 A1* | 9/2019 | Kim | G06V 10/40 |
| 2020/0320353 A1* | 10/2020 | Yang | G06V 20/70 |

OTHER PUBLICATIONS

Yu et al. ("An end-to-end neural network approach to story segmentation,"2017 Asia-Pacific Signal and Information Processing Association Annual Summit and Conference; Date of Conference: Dec. 12-15, 2017) (Year: 2017).*

Zhong et al. ("Learning Video-Story Composition via Recurrent Neural Network," 2018 IEEE Winter Conference on Applications of Computer Vision; Date of Conference: Mar. 12-15, 2018) (Year: 2018).*

Sigurdsson et al. ("Learning Visual Storylines with Skipping Recurrent Neural Networks," arXiv:1604.04279v2; Jul. 26, 2016) (Year: 2016).*

Jangseong Bae et al., "Image Caption Generation with Context-Gate", The Korean Institute of Information Scientists and Engineers, pp. 589-591, Jun. 2018 (16 pages total).

Changki Lee, "Image Caption Generation using Recurrent Neural Network", The Korean Institute of Information Scientists and Engineers, pp. 878-882, Aug. 2016 (11 pages total).

"Image Caption Generation using Recurrent Neural Network", pp. 23-40, Sep. 2016 (23 pages total).

Changki Lee, "Image Caption Generation using Recurrent Neural Network", The Korean Institute of Information Scientists and Engineers, Aug. 2016 (11 pages total).

"Video story learning technology based on deep learning", pp. 23-40, Sep. 2016 (23 pages total).

* cited by examiner

METHOD AND APPARATUS FOR GENERATING STORY FROM PLURALITY OF IMAGES BY USING DEEP LEARNING NETWORK

CROSS-REFERENCE TO RELATED APPLICATION

This application claims the benefit of Korean Patent Application No. 10-2018-0155438 filed on Dec. 5, 2018 and No. 10-2019-0065955 filed on Jun. 4, 2019 which is hereby incorporated by reference herein in its entirety.

BACKGROUND

1. Technical Field

Embodiments disclosed herein relate to a method and apparatus for generating a story from a plurality of images by using a deep learning network.

This work was partly supported by the Institute for Information & Communications Technology Promotion (2015-0-00310-SW.StarLab, 2017-0-01772-VTT, 2018-0-00622-RMI, 2019-0-01367-BabyMind) and Korea Evaluation Institute of Industrial Technology (10060086-RISF, P0006720-GENKO) grant funded by the Korea government.

2. Description of the Related Art

Deep learning networks that bring about innovations in science and technology are increasingly expanding their range of application. For example, they may be applied in such a manner as to extract features from images and classify content or reproduce other content (e.g., text, etc.) by using the features.

Among such deep learning networks, a convolution neural network (CNN) has a structure suitable for the learning of two-dimensional (2D) data, and is thus widely used in fields, such as image analysis.

Meanwhile, a recurrent neural network (RNN) is a model useful for the learning of data changing over time, such as time-series data. However, an RNN has the problem of long-term dependencies. A model that overcomes this problem is long short-term memory (LSTM).

In connection with this, U.S. Patent Application No. 2017/0132821, which is a background technology document, discloses a method and apparatus for automatically generating a caption for visual media, such as photos or a video. In particular, the patent application discloses a technology in which a caption is generated using data extracted from images and signal data received from a mobile device where visual media is present and object identification is applied to an image when data is extracted from the image.

Meanwhile, the above-described background technology corresponds to technical information that has been possessed by the present inventor in order to contrive the present invention or which has been acquired in the process of contriving the present invention, and can not necessarily be regarded as well-known technology which had been known to the public prior to the filing of the present invention.

SUMMARY

Embodiments disclosed herein are intended to propose a method and apparatus for generating a story from a plurality of images by using a deep learning network, in which the story is highly related to the images, is naturally developed overall, and maintains coherence.

According to an aspect of the present invention, there is provided a visual story generation method for generating a story from a plurality of images by using a deep learning network, the visual story generation method including: extracting features from a plurality of respective images by using the first extraction unit of a deep learning network; generating the structure of a story based on the overall feature of the plurality of images by using the second extraction unit of the deep learning network; and generating the story by using outputs of the first and second extraction units.

According to another aspect of the present invention, there is provided a non-transitory computer-readable storage medium having stored thereon a program that performs a visual story generation method for generating a story from a plurality of images by using a deep learning network, wherein the visual story generation method includes: extracting features from a plurality of respective images by using the first extraction unit of a deep learning network; generating the structure of a story based on the overall feature of the plurality of images by using the second extraction unit of the deep learning network; and generating the story by using outputs of the first and second extraction units.

According to still another aspect of the present invention, there is provided a computer program that is executed by a visual story generation apparatus and is stored in a storage medium to perform a visual story generation method for generating a story from a plurality of images by using a deep learning network, wherein the visual story generation method includes: extracting features from a plurality of respective images by using the first extraction unit of a deep learning network; generating the structure of a story based on the overall feature of the plurality of images by using the second extraction unit of the deep learning network; and generating the story by using outputs of the first and second extraction units.

According to still another aspect of the present invention, there is provided a visual story generation apparatus for generating a story from a plurality of images by using a deep learning network, the visual story generation apparatus including: an input/output unit configured to receive a plurality of images from the outside, and to output a story generated from the plurality of images; a storage unit configured to store a program for generating a story from a plurality of images; and a control unit configured to include at least one processor; wherein a deep learning network that is implemented by executing the program by the control unit includes: a first extraction unit configured to extract the features of the plurality of respective images; a second extraction unit configured to generate the structure of the story based the overall feature of the plurality of images; and a story generation module configured to generate the story by using outputs of the first extraction unit and the second extraction unit.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified to various different forms and then practiced. In order to more clearly illustrate the features of the embodiments, detailed descriptions of items that are well known to those having ordinary skill in the art to the following embodiments pertain will be omitted. In the drawings, portions unrelated to the following description will be omitted. Throughout the specification, similar reference symbols will be assigned to similar portions.

Throughout the specification and the claims, when one component is described as being "connected" to another component, the one component may be "directly connected" to the other component or "electrically connected" to the other component through a third component. Furthermore, when any portion is described as including any component, this does not mean that the portion does not exclude another component but means that the portion may further include another component, unless explicitly described to the contrary.

The embodiments will be described in detail below with reference to the accompanying drawings.

Figure 1:
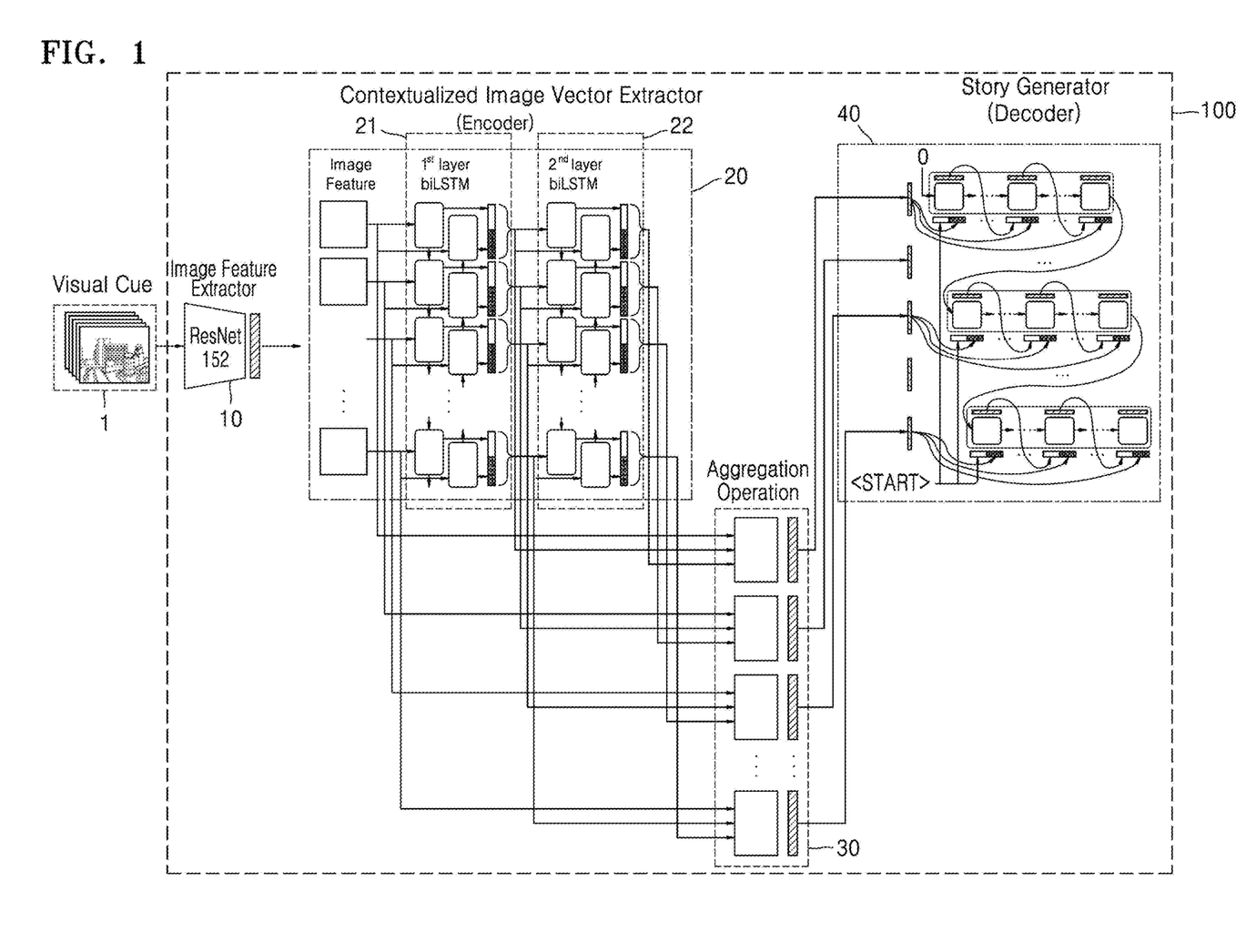
FIG. 1 is a diagram showing the configuration of a deep learning network for generating a story from a plurality of images according to an embodiment.
Figure 2:
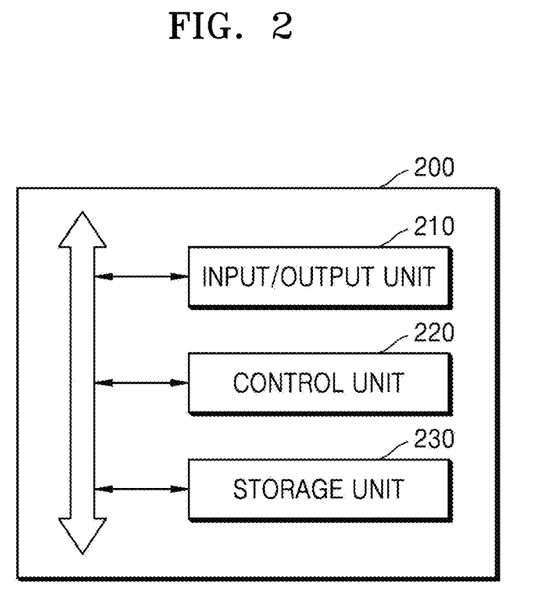
FIG. 2 is a diagram showing the configuration of a visual story generation apparatus for implementing the deep learning network of FIG. 1.

FIG. 1 is a diagram showing the configuration of a deep learning network 100 for generating a story from a plurality of images according to an embodiment, and FIG. 2 is a diagram showing the configuration of a visual story generation apparatus 200 for implementing the deep learning network 100 of FIG. 1.

Referring to FIG. 1, the deep learning network 100 for generating a story from a plurality of images according to the embodiment may include a first extraction unit 10, a second extraction unit 20, an aggregation unit 30, and a story generation module 40.

When visual cues 1 for a plurality of images are input to the deep learning network 100, the deep learning network 100 generates and outputs a corresponding story. The following description will be given on the assumption that when N sequential images V are input to the deep learning network 100, N sentences S corresponding thereto are generated.

The first extraction unit 10 extracts the features of a plurality of respective images, and transmits the extracted N features X to the second extraction unit 20. According to an embodiment, the first extraction unit 10 may be implemented using a CNN suitable for the learning of 2D data.

Meanwhile, although an illustration is made in FIG. 1 such that when the first extraction unit 10 transfers the N features X to the second extraction unit 20, the second extraction unit 20 processes an operation using the received N features X as input and also transmits the N features X to the aggregation unit 30, the first extraction unit 10 may transmit the N features X directly to the aggregation unit 30.

The second extraction unit 20 is a component configured to generate the structure of a story based on the overall feature of the plurality of images. For this purpose, the second extraction unit 20 may include the bidirectional long short-term memory (LSTM) of two or more layers. Although an example in which the second extraction unit 20 includes the bidirectional LSTM of two layers is shown in FIG. 1, it may include the LSTM of three or more layers.

The second extraction unit 20 receives the N features X from the first extraction unit 10, and outputs information C related to the overall feature of the plurality of images. In FIG. 1, the second extraction unit 20 includes a first layer and a second layer 22. In this case, the sum of the outputs of the first layer 21 and the second layer 22 is the information C.

The respective pieces of information that are output by the first layer 21 and the second layer 22 will be described in detail below.

The first layer 21 extracts the overall feature of the plurality of images, and transmits the extracted overall feature to the second layer 22 and the aggregation unit 30.

The second layer 22 receives the overall feature of the plurality of images, understands context indicated by the plurality of images, generates the structure of a story based on the understood context, and transmits the structure of the story to the aggregation unit 30.

As described above, the outputs of the first layer 21 and the second layer 22 are combined into the information C and then input to the aggregation unit 30. Furthermore, the features X output by the first extraction unit 10 are also input to the aggregation unit 30.

The aggregation unit 30 aggregates the N features X and the N pieces of information C, and outputs N vectors H to the story generation module 40.

The story generation module 40 generates a plurality of sentences based on the received N vectors H. The plurality of sentences generated by the story generation module 40 as described above is not only based on the structure of the story output by the second layer 22 of the second extraction unit 20, but also reflects the features of the plurality of respective images output by the first extraction unit 10 and the overall feature of the plurality of images output by the first layer 21 of the second extraction unit 20.

As described above, according to an embodiment, a story that is highly related to the images and is naturally developed overall may be generated by taking into consideration both the overall feature of the plurality of images and features unique to the respective images via two information channels.

Meanwhile, according to an embodiment, in order to increase the coherence of the plurality of sentences generated by the story generation module 40, a cascading mechanism may be applied to the story generation module 40.

Applying the cascading mechanism refers to generating sentences by connecting pieces of information between the sentences generated by the story generation module 40. For this purpose, the hidden values of a plurality of sentence generators included in the story generation module 40 may be sequentially connected.

For example, the hidden value of the first sentence generator included in the story generation module 40 is initialized to 0, and a hidden value output from each of the sentence generators is input to a subsequent sentence generator.

As described above, the effect of increasing the coherence of the overall story may be expected by connecting the pieces of information between the plurality of sentences.

The above-described deep learning network 100 shown in FIG. 1 may be implemented by the visual story generation apparatus 200 shown in FIG. 2.

Referring to FIG. 2, the visual story generation apparatus 200 according to the embodiment may include an input/output unit 210, a control unit 220, and a storage unit 230.

The input/output unit 210 is a component configured to receive a plurality of images from the outside and to output a story generated from the plurality of images. For example, the input/output unit 210 may include wired/wireless communication ports such as a USB port and a Wi-Fi module, input devices such as a keyboard and a mouse, and output devices such as a monitor.

The control unit 220 is a component including at least one processor such as a central processing unit (CPU), and is configured to implement a deep learning network and to perform operations required to generate a story from a plurality of images by driving the deep learning network. The control unit 220 may perform these operations by executing a program stored in the storage unit 23.

The storage unit 230 is a component configured to store a file, a program, etc. and may be constructed via various types of memory. In particular, the storage unit 230 may store a program configured to generate a story from a plurality of images, and the control unit 220 may implement a deep learning network by executing the program. Furthermore, the storage unit 230 may store a plurality of sequential images that is used as the input of the deep learning network.

Figure 3:
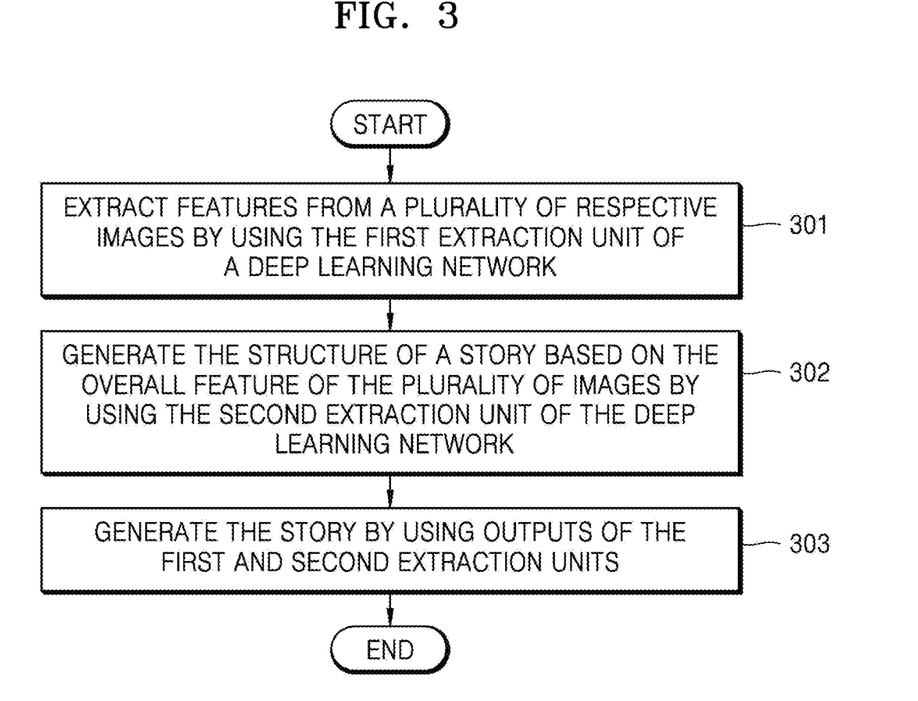
FIGS. 3 and 4 are flowcharts illustrating a visual story generation method for generating a story from a plurality of images by using a deep learning network according to an embodiment.
Figure 4:
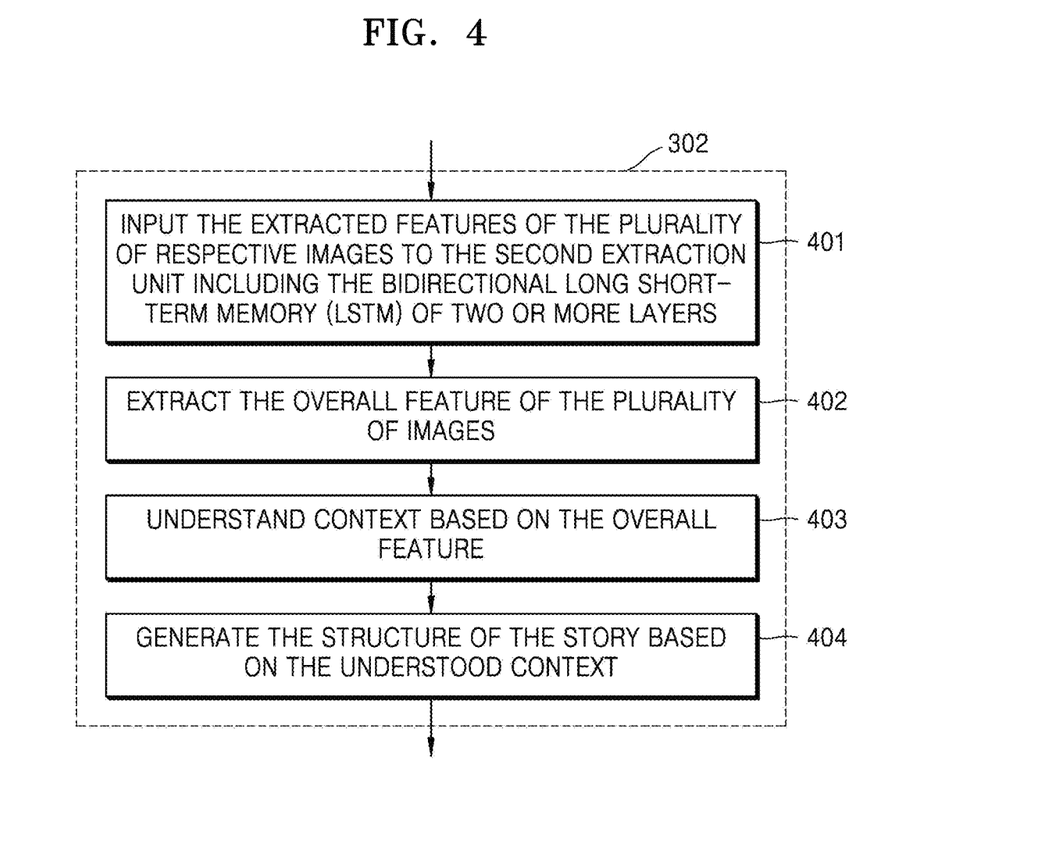

A visual story generation method for generating a story from a plurality of images by using the above-described deep learning network 100 and the above-described visual story generation apparatus 200 will be described below. FIGS. 3 and 4 are flowcharts illustrating a visual story generation method for generating a story from a plurality of images by using a deep learning network according to an embodiment. The visual story generation method according to the embodiment shown in FIGS. 3 and 4 includes steps that are performed in a time-series manner in the deep learning network 100 and the visual story generation apparatus 200 shown in FIG. 1 or 2. Accordingly, descriptions that are omitted below but are given above in conjunction with the deep learning network 100 and the visual story generation apparatus 200 shown in FIG. 1 or 2 may be also applied to the visual story generation method according to the embodiment shown in FIGS. 3 and 4.

Referring to FIG. 3, at step 301, the features of a plurality of respective images are extracted using the first extraction unit 10 of the deep learning network 100. According to an embodiment, features may be extracted from a plurality of respective images by using a convolution neural network suitable for the learning of 2D data.

At step 302, the structure of a story based on the overall feature of the plurality of images is generated using the second extraction unit 20 of the deep learning network 100. FIG. 4 shows detailed steps included in step 302.

Referring to FIG. 4, at step 401, the features of the plurality of respective images extracted at step 301 are input to the second extraction unit 20 that includes the bidirectional LSTM of two or more layers.

At step 402, the first layer 21 of the second extraction unit 20 extracts the overall feature of the plurality of images, and transmits the extracted overall feature to the second layer 22.

The second layer 22 understands the context indicated by the plurality of images based on the overall feature extracted at step 403, and generates the structure of a story based on the understood context at step 404.

The structure of the story output at step 404 is aggregated with the overall feature of the plurality of images extracted at step 402 and the features of the plurality of respective images extracted at step 301 by the aggregation unit 30, and an aggregation result is transmitted to the story generation module 40.

At step 303, the story generation module 40 generates a story by using the output of the first extraction unit 10 and the second extraction unit 20.

The story generation module 40 may apply a cascading mechanism in order to maintain the coherence of sentences that are generated.

In greater detail, pieces of information between the sentences generated by the story generation module 40 may be connected by sequentially connecting the hidden values of a plurality of sentence generators included in the story generation module 40.

For example, the hidden value of the first sentence generator included in the story generation module 40 is initialized to 0, and a hidden value output from each of the sentence generators is input to the next sentence generator.

As described above, a story that is highly related to the images and has natural overall development may be generated by taking into consideration both the overall feature of the plurality of images and features unique to the respective images via two information channels.

Furthermore, the effect of increasing the coherence of the overall story may be expected by connecting the pieces of information between the plurality of sentences.

Figure 5:
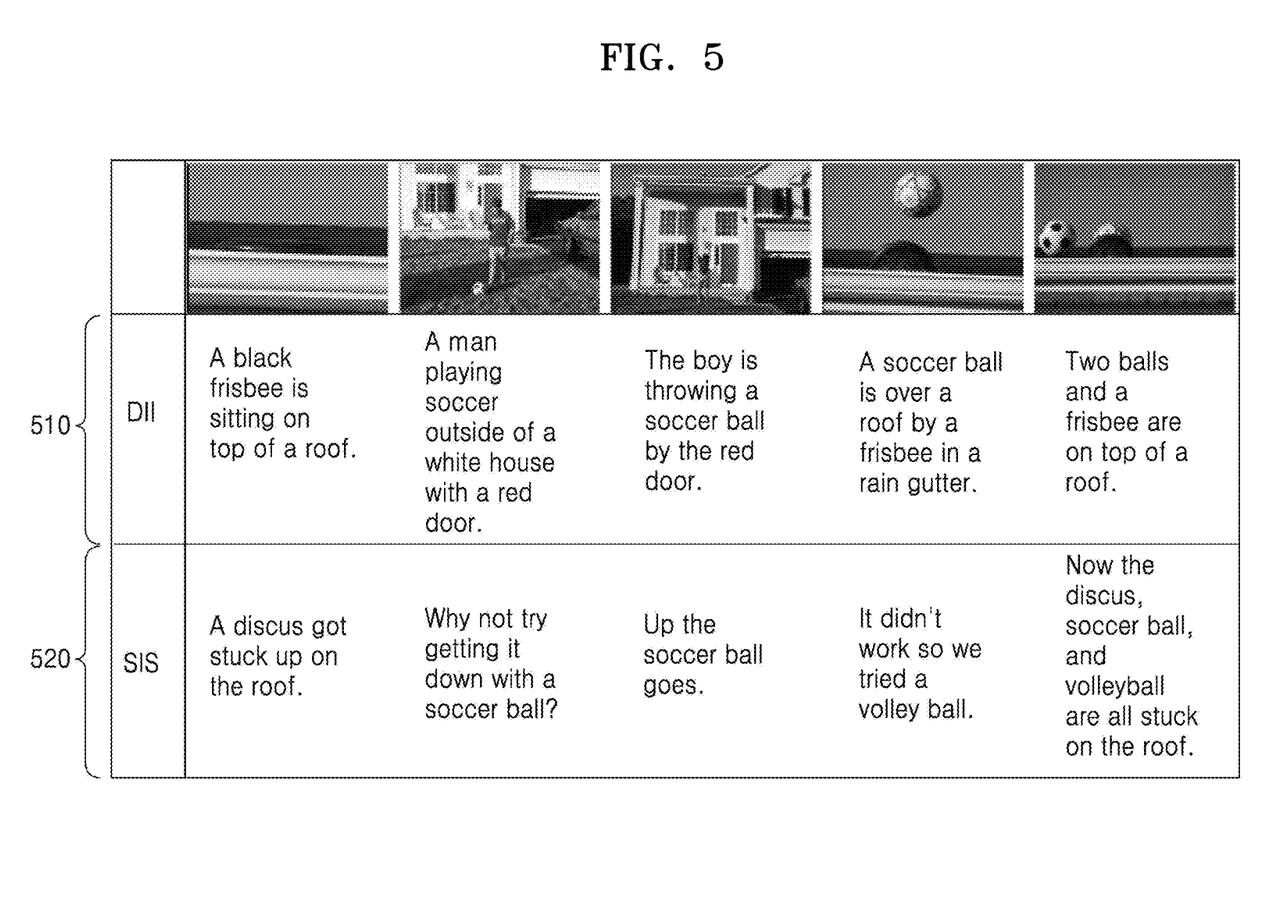
FIG. 5 is a view showing the comparisons between a story generated from a plurality of images by using a deep learning network according to an embodiment and sentences independently generated for the respective images by using the background technology.

FIG. 5 is a view showing the comparisons between a story generated from a plurality of images by using a deep learning network according to an embodiment and sentences independently generated for the respective images by using the background technology.

In area 510 of FIG. 5 are shown the sentences independently generated for the respective images by using the background technology are shown, and in area 520 of FIG. 5 are shown sentences generated from the plurality of images by using a deep learning network according to the above-described embodiment.

When the sentences shown in area 510 and the sentences shown in area 520 are compared with each other, the sentences shown in area 520 reflect the context indicated by the plurality of images overall and the flow of a story is developed accordingly, whereas the sentences shown in area 510 are felt individually written without continuity therebetween.

Figure 6:
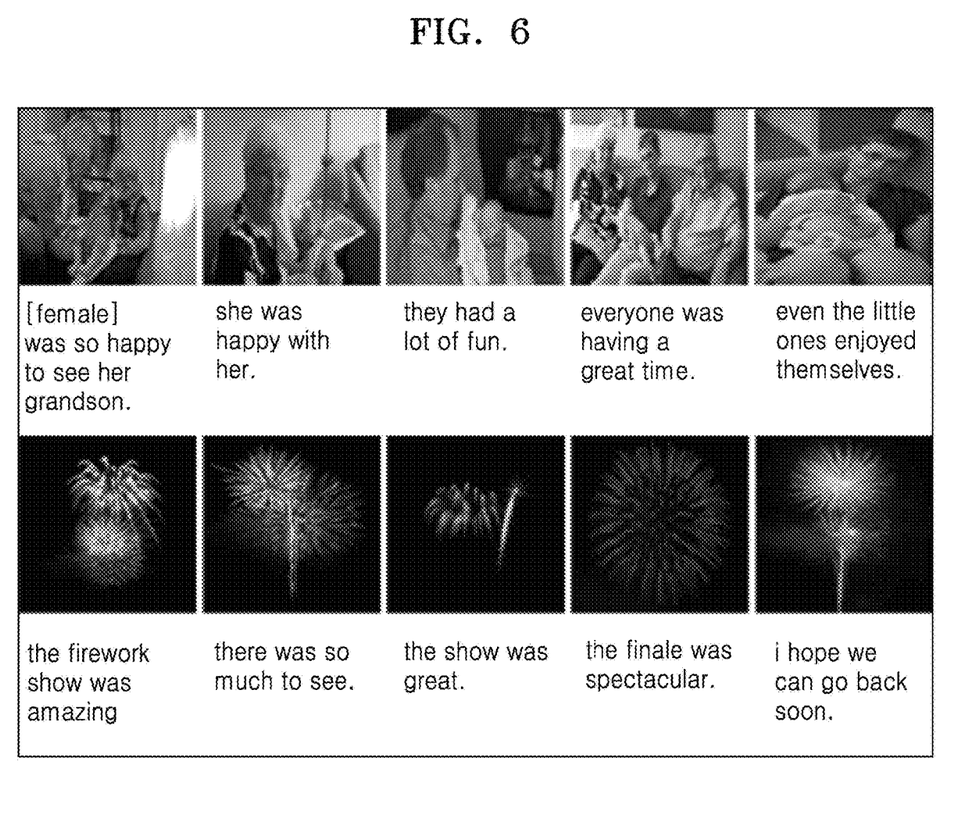
FIGS. 6 and 7 are views showing a story generated from a plurality of images by using a deep learning network according to an embodiment.
Figure 7:
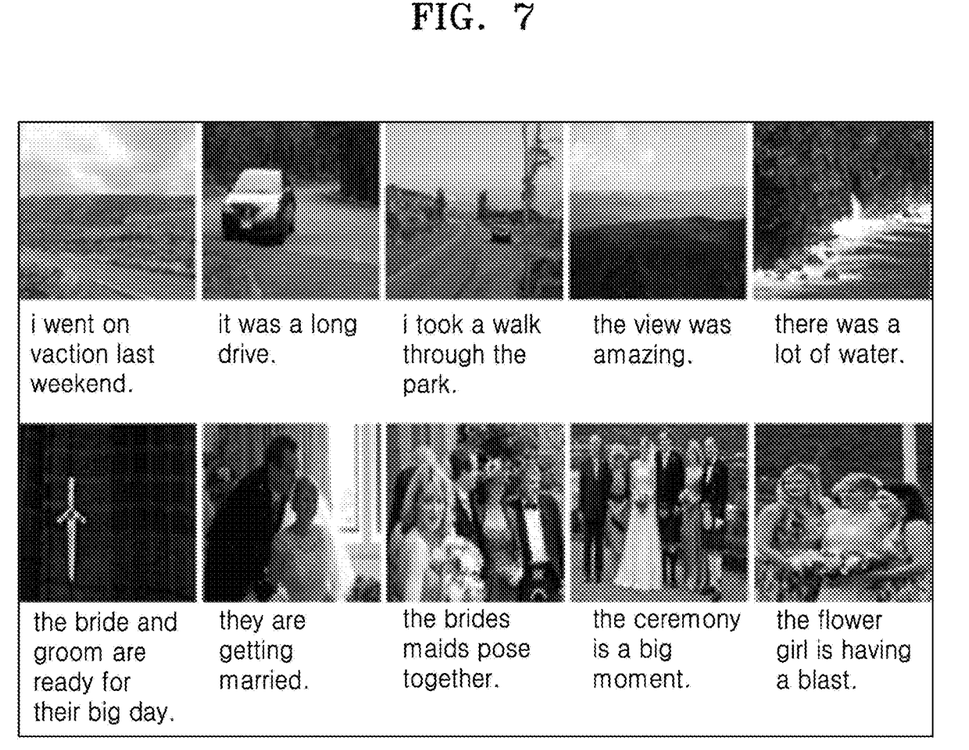

FIGS. 6 and 7 are views showing a story generated from a plurality of images by using a deep learning network according to an embodiment.

Referring to the pluralities of images and sentences shown in FIGS. 6 and 7, the plurality of images reflects overall context, and the flow of a story is developed accordingly.

The term "unit" used herein means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The visual story generation method according to the embodiment described in conjunction with FIGS. 3 and 4 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the visual story generation method according to the embodiment described in conjunction with FIGS. 3 and 4 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the visual story generation method according to the embodiment described in conjunction with FIGS. 3 and 4 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions that are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended merely for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

According to at least any one of the above-described embodiments, a story that is highly related to the images and is naturally developed overall may be generated by taking into consideration both the overall feature of a plurality of images and features unique to the respective images via two information channels.

Furthermore, the coherence of a story may be maintained by connecting pieces of information between generated sentences by applying a cascading mechanism to the story generation module configured to generate sentences.

The effects which may be acquired by the disclosed embodiments are not limited to the above-described effects, and other effects that have not been described above will be clearly understood by those having ordinary knowledge in the art, to which the disclosed embodiments pertain, from the foregoing description.

The scope of the present invention should be defined by the attached claims, rather than the detailed description. Furthermore, all modifications and variations which can be derived from the meanings, scope and equivalents of the claims should be construed as falling within the scope of the present invention.

What is claimed is:

1. A visual story generation method for generating a story from a plurality of images by using a deep learning network, the visual story generation method comprising:

extracting features from a plurality of respective images by using a first extraction unit of a deep learning network, the first extraction unit being implemented by at least one processor;

generating a structure of a story based on an overall feature of the plurality of images by using a second extraction unit of the deep learning network, the second extraction unit being implemented by the at least one processor; and generating the story by using outputs of the first and second extraction units,
wherein generating the structure of the story comprises:
inputting the extracted features of the plurality of respective images to the second extraction unit including bidirectional long short-term memory (LSTM) of two or more layers;
extracting, by the second extraction unit, the overall feature of the plurality of images;
understanding, by the second extraction unit, context based on the overall feature; and
generating, by the second extraction unit, the structure of the story based on the understood context.

2. The visual story generation method of claim 1, wherein generating the story comprises generating the story based on the generated structure of the story and generating sentences by connecting pieces of information between sentences included in the story.

3. The visual story generation method of claim 2, wherein generating the story is performed by applying a cascading mechanism such that a hidden value output by each sentence generator included in a story generation module implemented by the at least one processor and configured to generate the sentences is input to a subsequent sentence generator.

4. The visual story generation method of claim 1, wherein extracting the features from the plurality of respective images comprises extracting features from the plurality of respective images by using a convolution neural network.

5. A non-transitory computer-readable storage medium having stored thereon a program that performs the method set forth in claim 1.

6. A visual story generation apparatus for generating a story from a plurality of images by using a deep learning network, the visual story generation apparatus comprising:
an input/output unit configured to receive a plurality of images from an outside, and to output a story generated from the plurality of images;
a storage unit configured to store a program for generating a story from a plurality of images; and
at least one processor that implements a deep learning network by executing the program,
wherein the at least one processor implements:
a first extraction unit configured to extract features of the plurality of respective images;
a second extraction unit configured to generate a structure of the story based an overall feature of the plurality of images; and
a story generation module configured to generate the story by using outputs of the first extraction unit and the second extraction unit,
wherein the second extraction unit includes bidirectional long short-term memory (LSTM) of two or more layers, and
wherein the second extraction unit receives the features of the plurality of respective images extracted by the first extraction unit, extracts the overall feature of the plurality of images, understands context based on the overall feature, and generates the structure of the story based on the understood context.

7. The visual story generation apparatus of claim 6, wherein the story generation module generates the story based on the generated structure of the story and generates sentences by connecting pieces of information between sentences included in the story.

8. The visual story generation apparatus of claim 7, wherein:
the story generation module comprises a plurality of sentence generators; and
a cascading mechanism is applied to the story generation module such that a hidden value output by each of the plurality of sentence generators is input to a subsequent sentence generator.

9. The visual story generation apparatus of claim 6, wherein the first extraction unit is implemented using a convolution neural network.

* * * * *